US011353589B2

United States Patent
Coombe et al.

(10) Patent No.: US 11,353,589 B2
(45) Date of Patent: Jun. 7, 2022

(54) ITERATIVE CLOSEST POINT PROCESS BASED ON LIDAR WITH INTEGRATED MOTION ESTIMATION FOR HIGH DEFINITION MAPS

(71) Applicant: DeepMap Inc., Palo Alto, CA (US)

(72) Inventors: Gregory William Coombe, Mountain View, CA (US); Chen Chen, San Jose, CA (US); Derik Schroeter, Fremont, CA (US); Jeffrey Minoru Adachi, El Cerrito, CA (US); Mark Damon Wheeler, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 841 days.

(21) Appl. No.: 16/194,226

(22) Filed: Nov. 16, 2018

(65) Prior Publication Data
US 2019/0219700 A1  Jul. 18, 2019

Related U.S. Application Data

(60) Provisional application No. 62/588,157, filed on Nov. 17, 2017.

(51) Int. Cl.
*G01S 17/89* (2020.01)
*G01S 17/58* (2006.01)
(Continued)

(52) U.S. Cl.
CPC ............ *G01S 17/89* (2013.01); *G01S 7/003* (2013.01); *G01S 7/4802* (2013.01);
(Continued)

(58) Field of Classification Search
CPC .......... G01S 17/89; G01S 17/58; G01S 17/42; G01S 17/86; G01S 7/4802; G01S 7/4808; G01S 17/894
See application file for complete search history.

(56) References Cited

U.S. PATENT DOCUMENTS 10,649,088 B1 * 5/2020 Sebastian ............... G01S 17/26
2011/0194158 A1   8/2011 Kim et al.
(Continued)

FOREIGN PATENT DOCUMENTS

KR      101390466 B1 * 5/2014
WO    WO 2016/162568 A1   10/2016
WO    WO 2017/157967 A1    9/2017

OTHER PUBLICATIONS

Seungpyo Hong, Heedong Ko, and Jinwook Kim. Imaging Media Research Center. Korea Institute of Science and Technology, "VICP: Velocity Updating Iterative Closest Point Algorithm", May 3-8, 2010, IEEE, p. 1893-1898 (Year: 2010).*

(Continued)

*Primary Examiner* — Luke D Ratcliffe
*Assistant Examiner* — Woohyeong Cho
(74) *Attorney, Agent, or Firm* — Maschoff Brennan

(57) ABSTRACT

A system align point clouds obtained by sensors of a vehicle using kinematic iterative closest point with integrated motions estimates. The system receives lidar scans from a lidar mounted on the vehicle. The system derives point clouds from the lidar scan data. The system iteratively determines velocity parameters that minimize an aggregate measure of distance between corresponding points of the plurality of pairs of points. The system iteratively improves the velocity parameters. The system uses the velocity parameters for various purposes including for building high definition maps used for navigating the vehicle.

39 Claims, 14 Drawing Sheets

(51) Int. Cl.
- *G01S 7/48* (2006.01)
- *G05D 1/00* (2006.01)
- *G01S 7/00* (2006.01)
- *G01S 17/86* (2020.01)
- *G01S 17/42* (2006.01)

(52) U.S. Cl.
CPC ............ *G01S 7/4808* (2013.01); *G01S 17/58* (2013.01); *G01S 17/86* (2020.01); *G05D 1/00* (2013.01); *G01S 17/42* (2013.01)

(56) References Cited

U.S. PATENT DOCUMENTS

| | | | |
|---|---|---|---|
| 2014/0078519 A1* | 3/2014 | Steffey | G01S 7/4817 356/625 |
| 2015/0081156 A1 | 3/2015 | Trepagnier et al. | |
| 2015/0331111 A1 | 11/2015 | Newman et al. | |
| 2016/0124089 A1* | 5/2016 | Meinherz | G01S 17/86 356/5.01 |
| 2020/0226926 A1* | 7/2020 | Suzuki | G08G 1/168 |

OTHER PUBLICATIONS

Ji Zhang and Sanjiv Singh, "LOAM: LOAM: Lidar odometry and mapping in real-time", Robotics: Science and Systems Conference (RSS), Jul. 2014. (Year: 2014).*
Wikipedia, "Adaptive step size", Dec. 18, 2015 (Year: 2015).*
Wikipedia, "Kalman filter", Aug. 6, 2016 (Year: 2016).*
Hong, S. et al., "VICP: Velocity Updating Iterative Closest Point Algorithm," IEEE International Conference on Robotics and Automation, May 3-8, 2010, pp. 1893-1898, Anchorage, Alaska, USA.
PCT International Search Report and Written Opinion, PCT Application No. PCT/US2018/061483, dated Feb. 7, 2019, 18 pages.
Hashimoto, et al., Voting Based Fault Isolation of In-Vehicle Multi-Sensors, SICE Annual Conference 2008, Aug. 20, 2008.
European Search Report issued in corresponding application No. 18879500.9, dated Jul. 5, 2021.

* cited by examiner

ITERATIVE CLOSEST POINT PROCESS BASED ON LIDAR WITH INTEGRATED MOTION ESTIMATION FOR HIGH DEFINITION MAPS

CROSS REFERENCE TO RELATED APPLICATIONS

This application claims the benefit of priority under 35 USC 119(e) to U.S. Provisional Application No. 62/588,157, filed on Nov. 17, 2017, which is incorporated herein by reference in its entirety for all purposes.

BACKGROUND

This disclosure relates generally to alignment of point clouds generated by a lidar mounted on a moving vehicle, and more particularly to an iterative closest point technique with integrated motion estimation for aligning point clouds generated by a lidar mounted on a moving vehicle.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

Techniques for creating maps use iterative closest point (ICP) techniques for processing point clouds. A vehicle generates point clouds using sensor data, for example, lidar scans. Rotational lidars, such as VELODYNE HDL, sweep the environment by shooting lidar beams in a circular fashion. Each laser beam provides a distance measurement between the reflective object and the center of the lidar. As the lidar rotates, it generates a stream of points, which are split into point clouds. For a stationary lidar, each point is relative to a single scan center. However, for autonomous driving, the lidar is mounted on top of a moving vehicle as it rotates, so the center of a scan is dependent on the motion of the vehicle at a particular timestamp. The conventional ICP process estimates the motion by treating each point cloud as having a single center. As a result, the measured point cloud from lidar is not consistent with the real world. In order to know where each center point is, the system need to know the motion along the path.

Conventional techniques first estimate the motion of the vehicle using the raw point clouds and then apply this motion to the points and then repeat this process. This process can be unstable and if iterated a few times the results can diverge resulting in larger and larger errors. As a result, conventional techniques either fail to align point clouds, thereby result in inefficiencies that cause slow convergence of the computations. Alternatively, the conventional techniques result in error in the alignment process that subsequently causes errors in the high-definition maps generated.

SUMMARY

Embodiments of the invention align point clouds obtained by sensors of an autonomous vehicle using kinematic iterative closest point technique with integrated motions estimates. The system receives from a lidar mounted on an autonomous vehicle, sensor data describing environment surrounding the vehicle. The sensor data comprises a plurality of points and each point is associated with a time of capture of the point by the lidar sensor. The system determines based on the plurality of points, a source point cloud and a target point cloud. The system initializes a plurality of velocity parameters describing movement of the autonomous vehicle.

The system repeats the following steps for a plurality of iterations. The system determines a plurality of correspondences, each correspondence representing a pairs of points. The pair of points includes a point from the source point cloud and a corresponding point from the target point cloud. The system modifies the velocity parameters to optimize an aggregate measure of distance between corresponding points of the plurality of pairs of points. These steps are repeated, for example, until a measure of error between the two point clouds reaches below a threshold.

The system determines control signals for navigating the autonomous vehicle based on the velocity parameters and navigating the autonomous vehicle based on the control signals. For example, the system may use the kinematic ICP process to align point clouds that are used to build high definition maps. The autonomous vehicle uses the high definition maps for purposes of navigation.

In an embodiment, the system adjusts at least one of the source point cloud or the target point cloud based on the velocity parameters. The adjustment comprises transforming the points of the point cloud based on the velocity parameters and the time of capture of the point. For example, the system uses the velocity parameters to determine for a point, an estimate of the distance traveled by the autonomous vehicle in a time interval between the time of capture of the point and a reference time. The reference point may represent the time corresponding to the capture of the last point of the point cloud representing the completion of the capture of the point cloud. The system moves the point of a point cloud by the estimated distance.

In an embodiment, the system performs optimization of the aggregate measure of distance between correspondences using a non-linear optimization technique, for example gradient descent. In an embodiment, the system optimizes the velocity parameters by using one or more constraints limiting the velocity parameters to estimates of maximum velocity parameters determined based on physical movement of the autonomous vehicle.

In an embodiment, the system initializes the plurality of velocity parameters based on data obtained from an inertial measurement unit of the autonomous vehicle or based on global navigation satellite system (GNSS).

In an embodiment, the system determines the measure of distance between a pair of corresponding points by determining a normal direction along a surface of the target point cloud at the target point and determining a distance between the source point and the target point along the normal direction.

In an embodiment, the system determines that a source point of the source point cloud corresponds to a target point of the target point cloud if the target point of the target point cloud is a nearest neighbor of the source point and the source point of the source point cloud is determined to be a nearest neighbor of the target point.

Although various embodiments are described in the context of autonomous vehicles, the techniques described are applicable to other navigable machines for example, other types of vehicles and robots that can receive sensor signals such as lidar signals and navigate based on the sensor signals. Furthermore, embodiments are described herein using lidars as sensors. However the techniques disclosed are applicable to other sensors for example, a pair of cameras such as left and right cameras that can be used to generate 3D coordinates via triangulation.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Embodiments generate and maintain high definition (HD) maps that are accurate and include the most updated road conditions for safe navigation.

Figure 1:
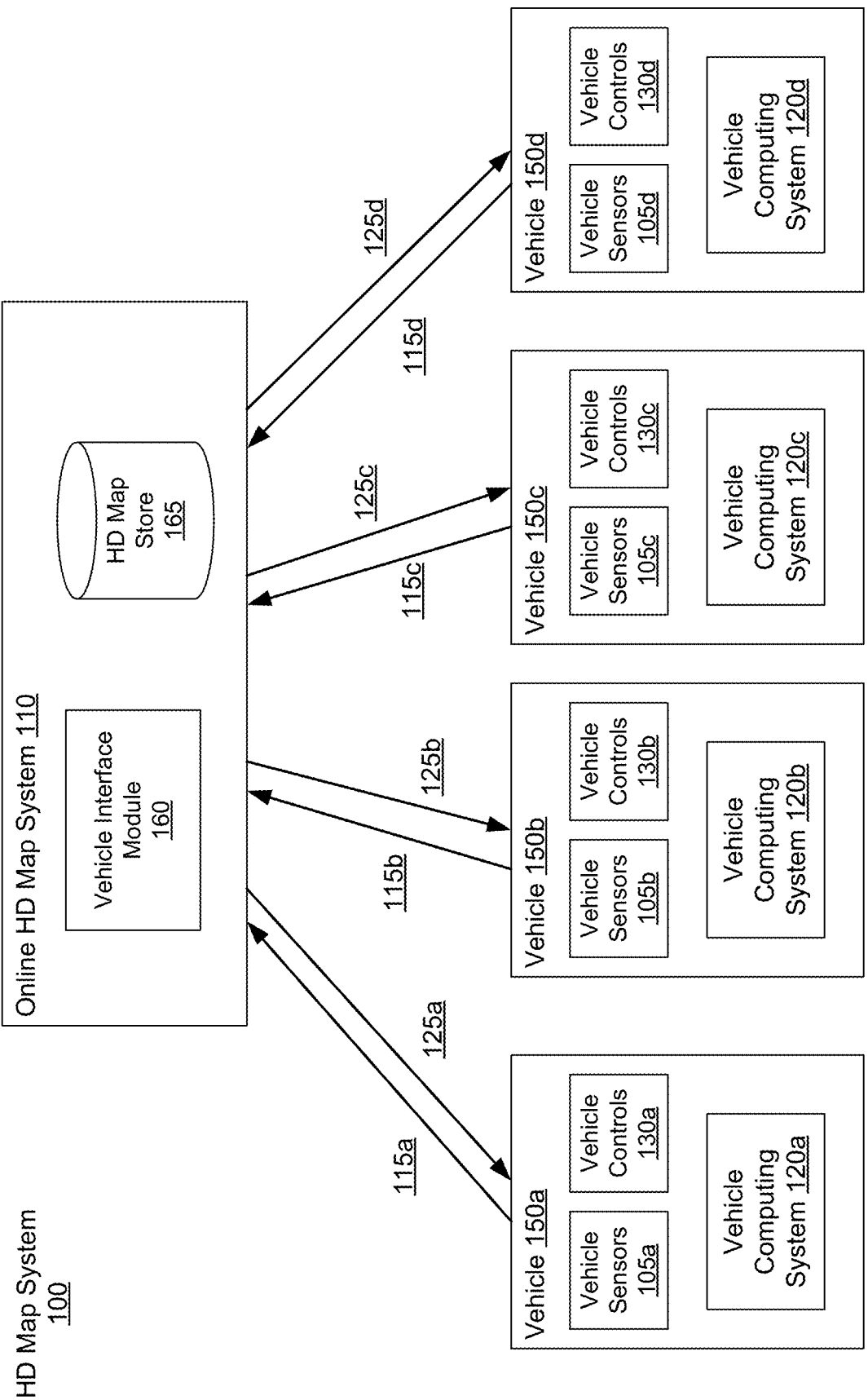
FIG. 1 shows the overall system environment of an HD map system interacting with multiple vehicle computing systems, according to an embodiment.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
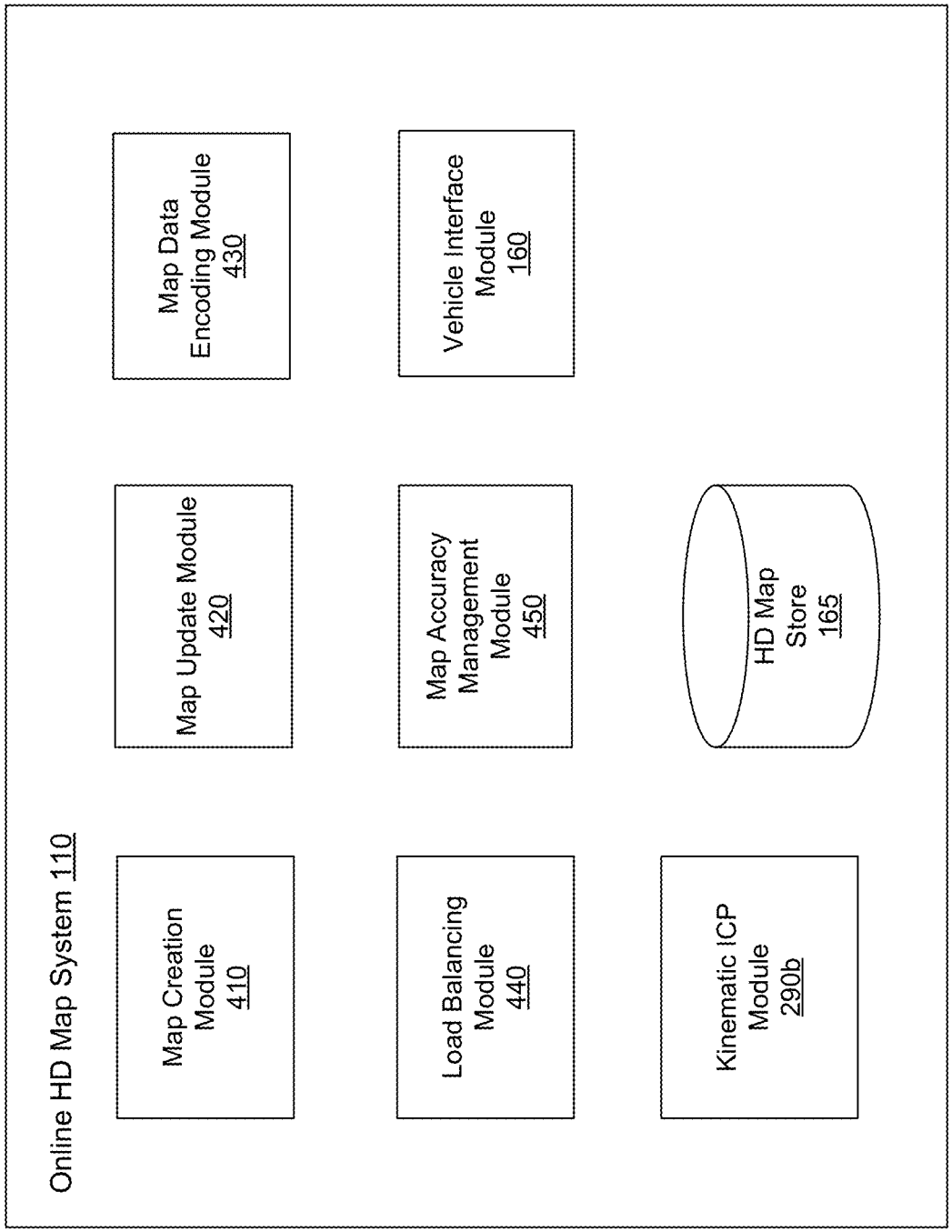
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
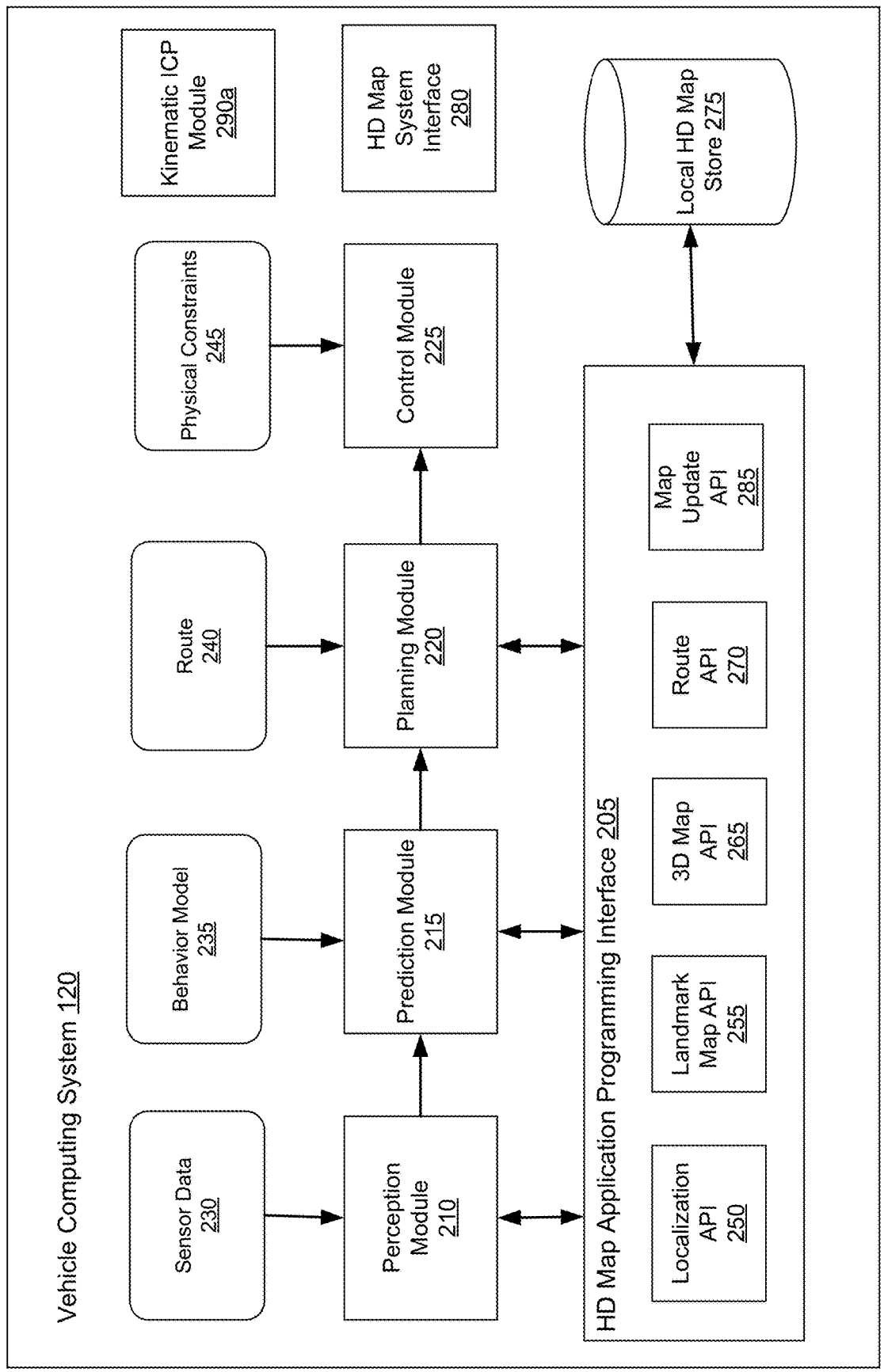
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a kinematic ICP module 290*a*, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules. Details of the kinematic ICP module 290*a* are described in detail herein.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
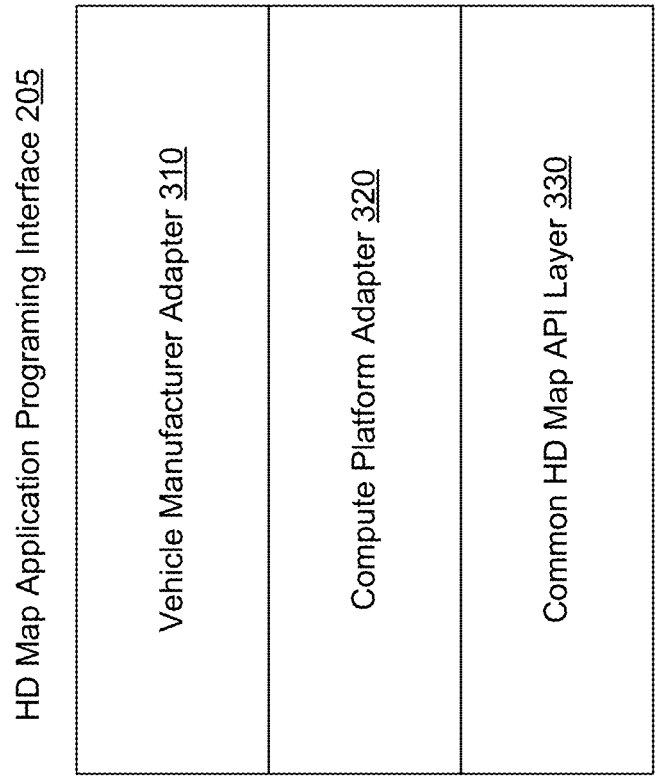
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, a kinematic ICP module 290*b*, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors. Details of the kinematic ICP module 290*b* are described in detail herein.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
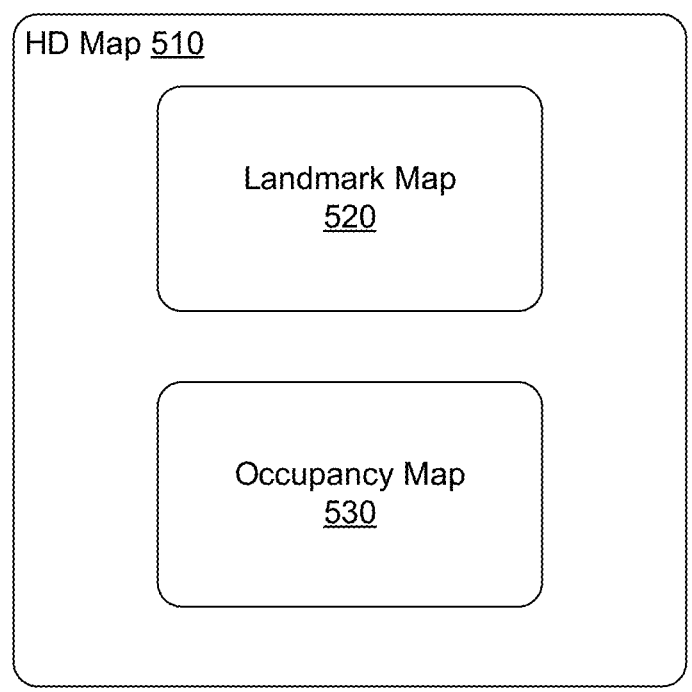
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
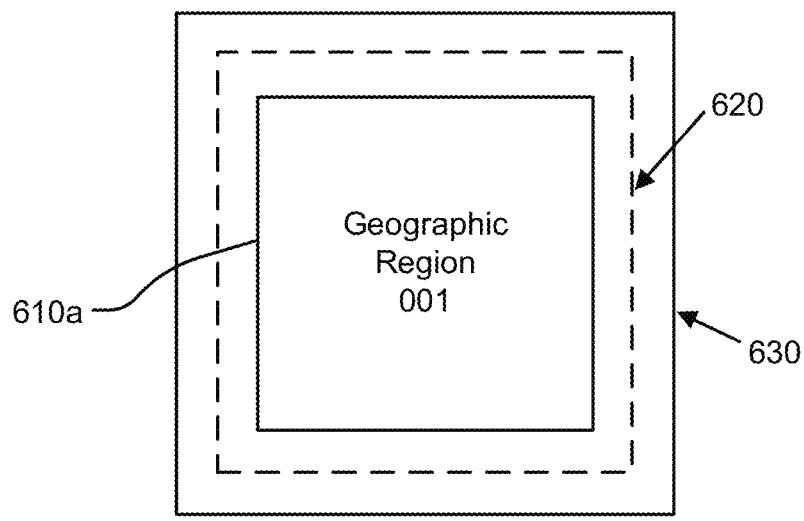
FIGS. 6A-B illustrate geographical regions defined in an HD map, according to an embodiment.
Figure 6B:
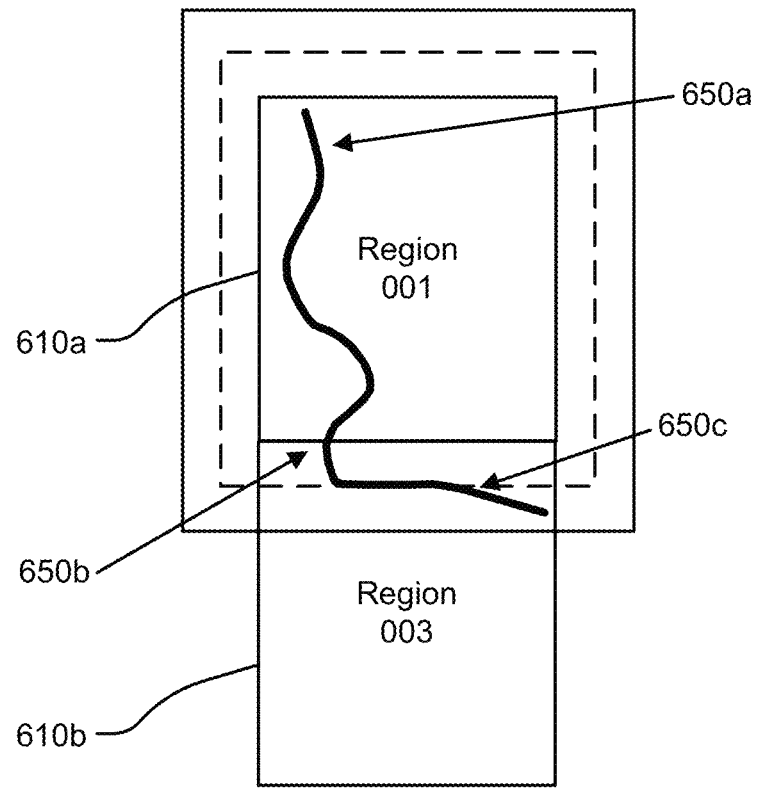

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane.

Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
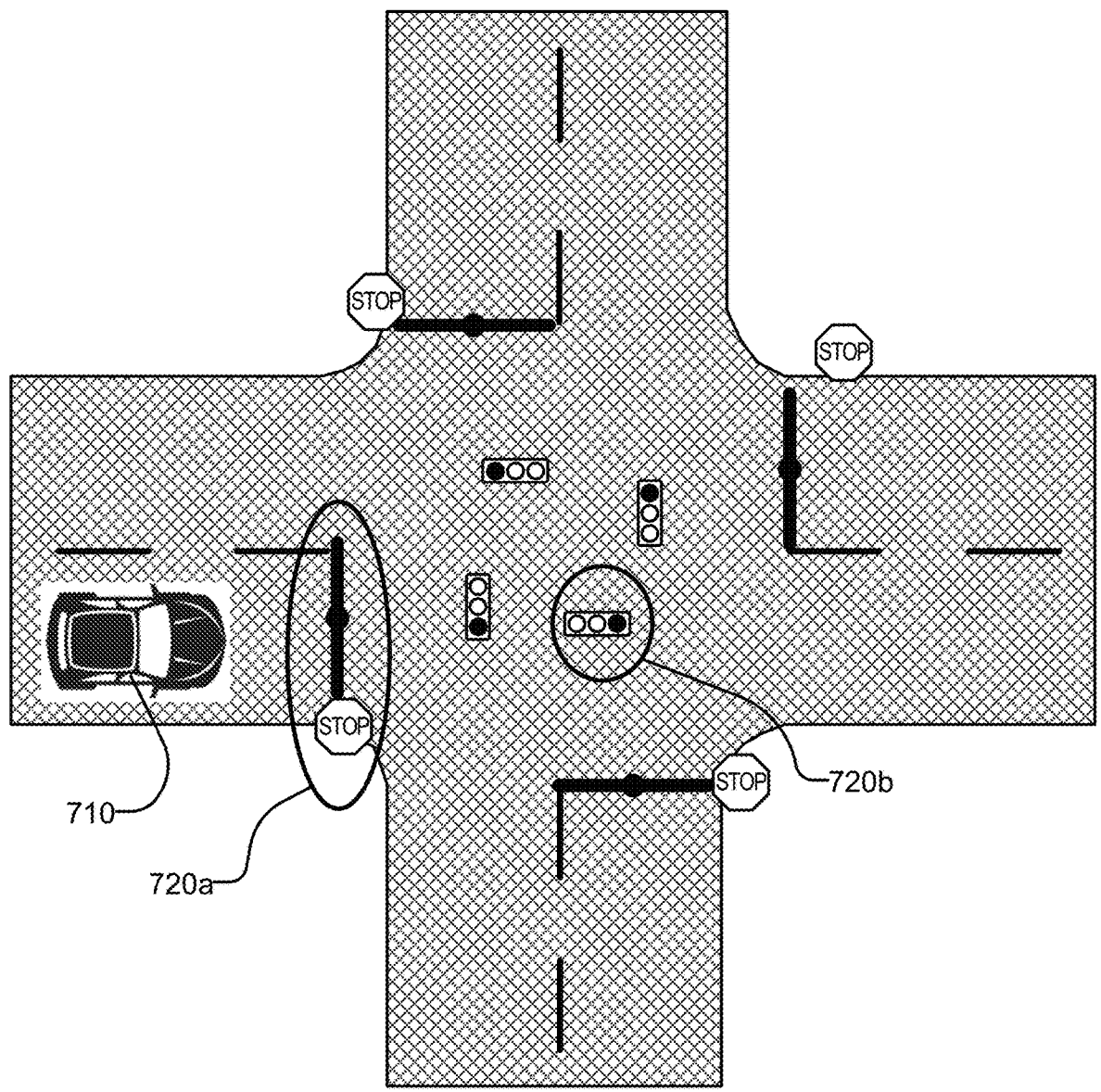
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
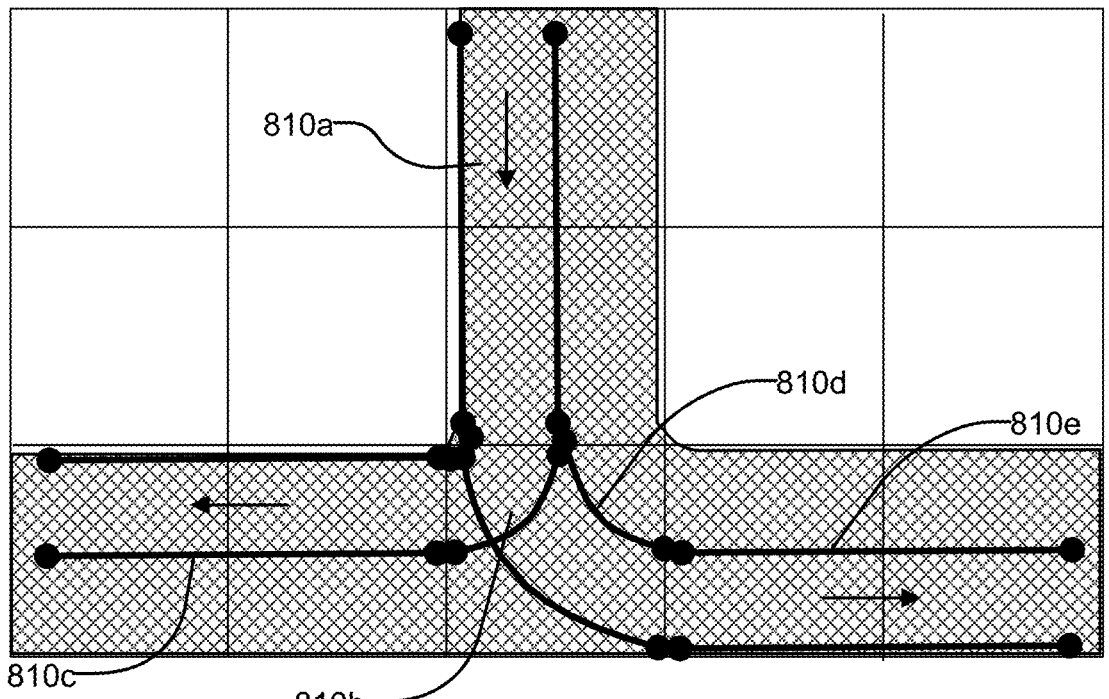
FIGS. 8A-B illustrates lane elements and relations between lane elements in an HD map, according to an embodiment.
Figure 8B:
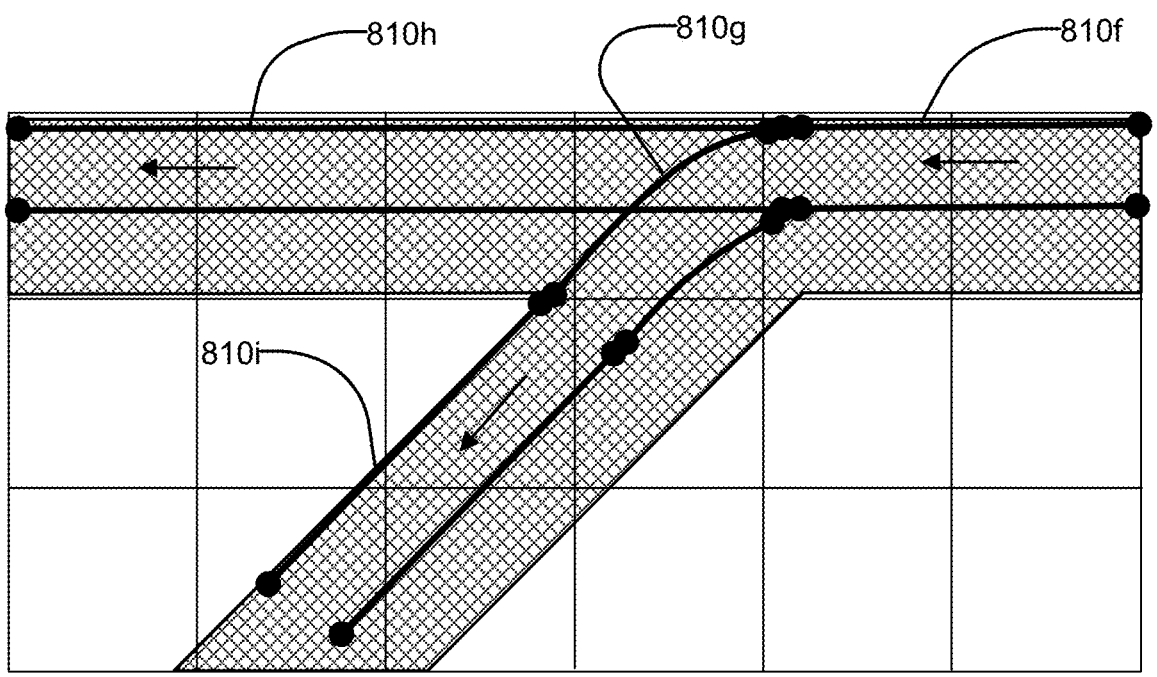

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Kinematic ICP Module

The kinematic ICP module 290 performs alignment of point clouds generated by a lidar mounted on a moving vehicle. For example, the kinematic ICP module 290 may perform alignment of two point clouds that are captured by a lidar mounted on a vehicle, for example, a source point cloud P1 and a target point cloud P2. The two point clouds may be captured at different times or may capture an area with slightly different viewpoints. The kinematic ICP module 290 determines a transform that maps points of one point cloud to points of the other point cloud, for example, maps points of the source point cloud P1 to corresponding points of the target point cloud P2. A distance between two points can be the Euclidean distance between coordinates of the points but can be any measure of distance. Points of the point cloud may be represented using coordinates in a coordinate system and may include other parameters, for example, intensity, color, and the like. The intensity and color values may be provided by the lidar. A distance metric between two points may consider these additional parameters, for example, by ensuring that the intensity, color, etc. match and are within a predetermined threshold.

The kinematic ICP module 290 uses iterative closest point technique to determine velocity parameters for the vehicle. The kinematic ICP module 290 performs computations based on kinematic equations to determine velocity parameters. The kinematic ICP module 290 determines distances travelled by a vehicle using the velocity parameters. In an embodiment, the kinematic ICP module 290 uses equation (1) for determining position of the vehicle, assuming constant acceleration:

$$p = p_0 + v_0 t + \tfrac{1}{2} a t^2 \qquad (1)$$

In equation (1), p represents the current position of the vehicle, a represents acceleration, t represents time, $p_0$ represents the position of the vehicle at a previous time t=0, and $v_0$ represents the velocity of the vehicle at the previous time t=0. The kinematic ICP module 290 receives timestamps for every column of points in the lidar point cloud, and determines the position of each point. Accordingly, the kinematic ICP module 290 solves for the motion and the unwinding of the point cloud simultaneously, and uses the natural constraints of the physical system to avoid divergence.

Typically each point cloud includes several thousand points. In an embodiment, the kinematic ICP module 290 performs sampling of the points of the point cloud to reduce the amount of computation. For example, the kinematic ICP module 290a of a vehicle computing system 120 may perform sampling of the point cloud to obtain a significantly smaller percentage of points of the point clouds that is processed compared to the kinematic ICP module 290b of the online HD map system 110. This is so because the kinematic ICP module 290a of a vehicle computing system 120 may need to perform the computation in real time as the vehicle is driving to be able to determine the location of the vehicle for purposes of navigating the vehicle. In an embodiment, the kinematic ICP module 290 performs sampling by dividing the region represented by the point cloud into voxels and randomly selecting one or more points from each voxel. The degree of sampling may be controlled by controlling the size of the voxels. For example the kinematic ICP module 290 may use small voxels for dense sampling that generates large number of points and may use large voxels for sparse sampling that generates fewer points.

Figure 10:
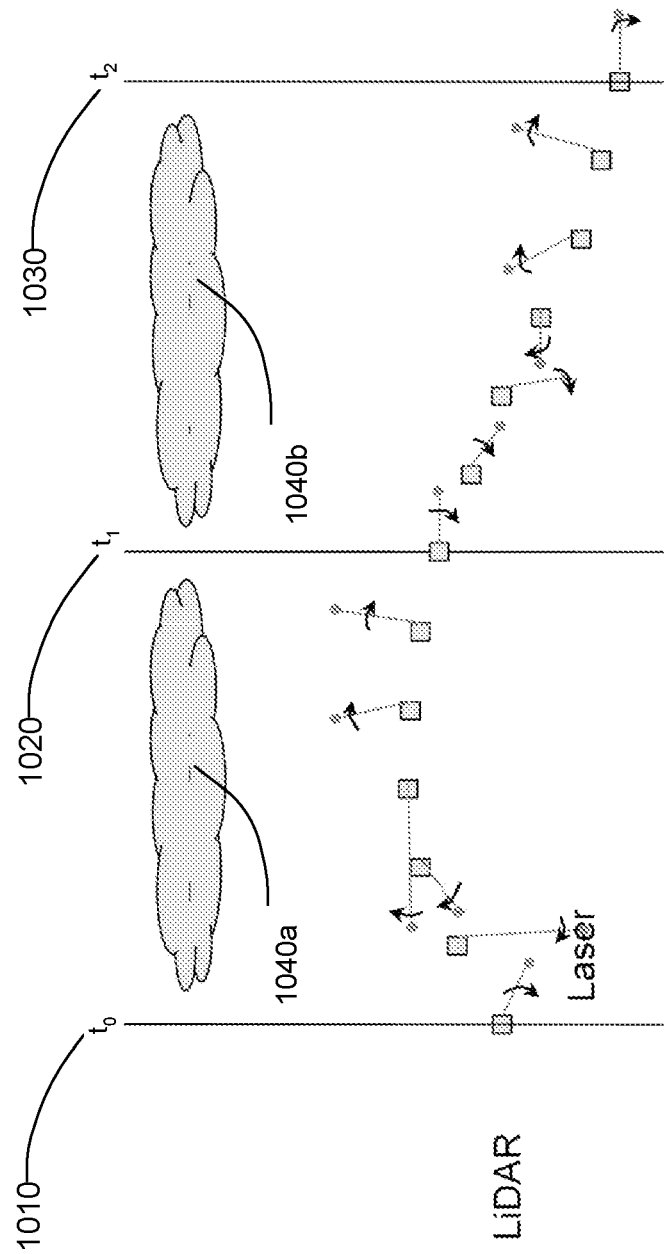
FIG. 10 illustrates two point clouds captured by lidar scans of a moving vehicle according to an embodiment.

For sequential point clouds captured by a lidar mounted on a moving vehicle, the start of the 1st point cloud is $t_0$, the end of the first and start of the 2nd is $t_1$, and the end of the 2nd is $t_2$. The kinematic ICP module 290 determines the following velocity parameters: at time $t_0$: $v(t_0)$, $\omega(t_0)$, at time $t_1$: $v(t_1)$, $\omega(t_1)$, at time $t_2$: $v(t_2)$, $\omega(t_2)$ where $v(t_x)$ represents the linear velocity at time $t_x$ and $\omega(x)$ represents the angular velocity at time $t_x$. FIG. 10 illustrates two point clouds captured by lidar scans of a moving vehicle according to an embodiment. As shown in FIG. 10, the kinematic ICP module 290 identifies a source point cloud 1040a and a target point cloud 1040b and uses the following velocity parameters: the linear velocity and the angular velocity at the time of the start of capture of the source point cloud and the linear velocity and the angular velocity at the time of the end of capture of the source point cloud; and the linear velocity and the angular velocity at the time of the start of capture of the target point cloud and the linear velocity and the angular velocity at the time of the end of capture of the target point cloud. If the source point cloud and the target point clouds were captured consecutively, the time of the end of capture of the source point cloud is same as the time of the start of capture of the target point cloud. Accordingly the kinematic ICP module 290 determines the linear velocity and the angular velocity for three distinct points in time, $t_0$ the time 1010 of start of capture of the source point cloud $t_1$ the time 1020 of end of capture of the source point cloud which is same as the time of start of capture of the target point cloud and $t_2$ the time 1030 of end of capture of the target point cloud.

The linear velocity parameters have three components: a component along X-axis, a component along Y-axis, and a component along Z-axis. The angular velocity has three components, a roll component, a yaw component and a pitch component. Accordingly, for each time point there are 6 velocity parameters. Since there are three time points, the kinematic ICP module 290 determines 18 velocity parameters. The kinematic ICP module 290 performs an 18-degrees of freedom (DOF) optimization problem to determine the 18 velocity parameters. In addition, since the system is modeling the motion of a vehicle on the road, the kinematic ICP module 290 uses physical constraints on the translational speed and acceleration limits to prevent the non-linear optimization from getting stuck in non-realistic local minima that is not physically possible. For example, the kinematic ICP module 290 uses a value of maximum acceleration $MAX\_ACCELERATION_{xyz}$ along each axis X, Y, and Z. Accordingly, in an embodiment, the kinematic ICP module 290 adds the following constraints specified by equations (2) and (3) while optimizing the velocity parameters.

$$|v(t_{i+1})_{xyz} - v(t_i)_{xyz}|/\Delta t \leq MAX\_ACCELERATION_{xyz} \quad (2)$$

$$v_{min} \leq v(t_i) \leq v_{max} \quad (3)$$

According to equation (2), a velocity component $v(t_{i+1})_{xyz}$ along an axis at time $t_{i+1}$ is within a threshold of $v(t_i)_{xyz}$, the corresponding velocity component at time $t_i$ where the threshold is directly proportional to the $MAX\_ACCELERATION_{xyz}$ value along that axis and the time difference $\Delta t = t_{i+1} - t_i$. Equation (3) specifies that the velocity $v(t_i)$ at any given time $t_i$ can be constrained to have a value between a high threshold value $v_{max}$ and a low threshold value $v_{min}$. For example, using some knowledge of the vehicle performance, $v_{min}$=−20 mile/hour (a limit of the velocity of a vehicle moving backwards on a road) and $v_{max}$=120 mile/hour (a limit on velocity of forward moving vehicle on a road). In an embodiment, the kinematic ICP module 290 also bounds the rotational speed and accelerations by following equations (4) and (5). Accordingly, each component of the angular velocity $\omega(t_i)$ at time $t_i$ is constrained to be less than a threshold MAX_ANGULAR_SPEED specified by physical constraints of a vehicle driving on roads. Similarly, each component of the linear velocity $v(t_i)$ at time $t_i$ is constrained to be less than a threshold $v_{max}^{turn}(R)$ representing the maximum turning speed, which is a function of the turning radius R.

$$|\omega(t_i)| \leq MAX\_ANGULAR\_SPEED \quad (4)$$

$$|v(t_i)| \leq v_{max}^{turn}(R) \quad (5)$$

In some embodiments, the kinematic ICP module 290 uses constraints based on more complex vehicle dynamics models such as Ackerman model constraints.

In some embodiments, the kinematic ICP module 290 performs computations based on an assumption of constant acceleration over the duration of the timespan (from $t_0$ to $t_2$). Since the lidar is typically collecting data at a relatively high frequency (for example, 10 Hz), assuming a constant acceleration does not result in significant loss of accuracy during the small time window of interest. This model provides higher accuracy than a simple constant velocity model based model. A constant velocity model based model does not meet the accuracy requirement for building an HD map due to significant changes in the translational and rotational velocities of a moving vehicle when turning, stopping, or accelerating during the course of a single lidar scan. For example, when turning, a vehicle can complete a 90 degree turns within seconds. If the system assumes a linear turning speed, the computations result in large angular errors, which results in large distance error (>10 cm) for laser measurements with high range.

In some embodiments, kinematic ICP module 290 uses a more advanced model, e.g., higher-order parameterization on acceleration. These models have higher complexity and require more parameters.

Under the assumption that the translation and angular accelerations are constant in the time intervals ($t_0$, $t_1$) and ($t_1$, $t_2$), the kinematic ICP module 290 uses following equations 6a, 6b, 6c, and 6d to compute the linear velocity and angular velocity at any arbitrary time t via interpolation.

$$t \in [t_0, t_1], v(t) = \frac{t_1 - t}{t_1 - t_0} v_0 + \frac{t - t_0}{t_1 - t_0} v_1 \quad (6a)$$

$$t \in [t_0, t_1], \omega(t) = \frac{t_1 - t}{t_1 - t_0} \omega_0 + \frac{t - t_0}{t_1 - t_0} \omega_1 \quad (6b)$$

$$t \in [t_1, t_2], v(t) = \frac{t_2 - t}{t_2 - t_1} v_1 + \frac{t - t_1}{t_2 - t_1} v_2 \quad (6c)$$

$$t \in [t_1, t_2], \omega(t) = \frac{t_2 - t}{t_2 - t_1} \omega_1 + \frac{t - t_1}{t_2 - t_0} \omega_2 \quad (6d)$$

The kinematic ICP module 290 uses following equations 7a, 7b, 7c, and 7d obtained by integration of equations 6a, 6b, 6c, and 6d respectively to compute the location (represented as x(t)) and roll, pitch, yaw values (represented as R(t)) at arbitrary timestamp t as follows:

$$t \in [t_0, t_1], x(t) = v_0(t - t_0) + \frac{v_1 - v_0}{2(t_1 - t_0)} (t - t_0)^2 \quad (7a)$$

$$t \in [t_0, t_1], R(t) = \omega_0(t - t_0) + \frac{\omega_1 - \omega_0}{2(t_1 - t_0)} (t - t_0)^2 \quad (7b)$$

$$t \in [t_1, t_2], x(t) = x(t_1) + v_1(t - t_1) + \frac{v_2 - v_1}{2(t_2 - t_1)} (t - t_1)^2 \quad (7c)$$

$$t \in [t_1, t_2], R(t) = R(t_1) + \omega_1(t - t_1) + \frac{\omega_2 - \omega_1}{2(t_2 - t_1)} (t - t_1)^2 \quad (7d)$$

The integrated translation and rotation can be mapped to a 4×4 transformation matrix M(t) represented using equation (8) as follows.

$$M(t) = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma & x_1 \\ \sin\alpha\cos\beta & \sin\alpha\sin\beta\sin\gamma + \cos\alpha\cos\gamma & \sin\alpha\sin\beta\cos\gamma - \cos\alpha\sin\gamma & x_2 \\ -\sin\beta & \cos\beta\sin\gamma & \cos\beta\cos\gamma & x_3 \\ 0 & 0 & 0 & 1 \end{bmatrix} \quad (8)$$

where, $x(t)=[x_1, x_2, x_3]^T$, $R(t)=[\gamma, \beta, \alpha]$, where $\gamma, \beta, \alpha$ is the corresponding roll, pitch, yaw value.

Figure 9:
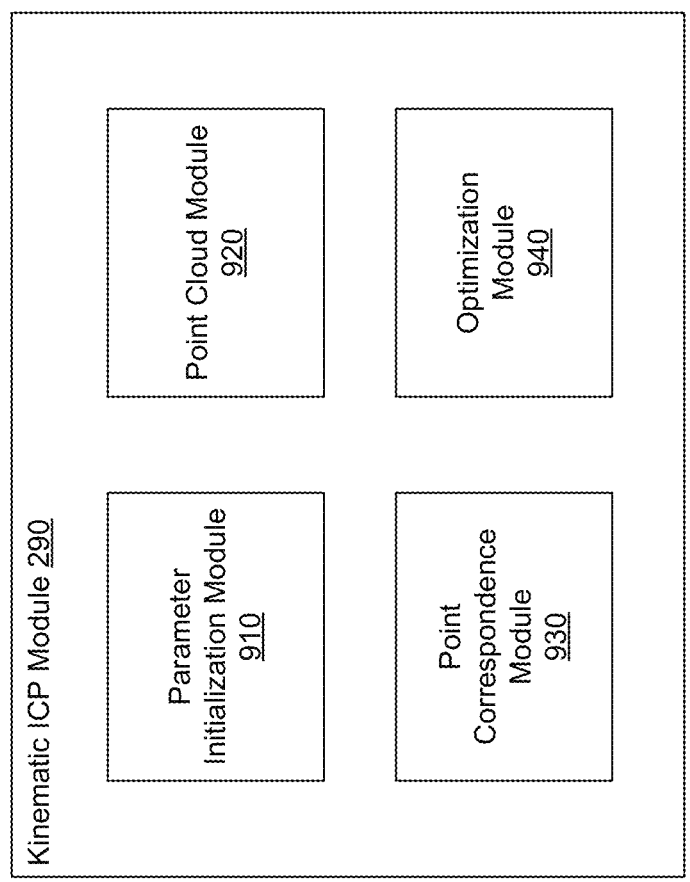
FIG. 9 shows the system architecture of a kinematic ICP module, according to an embodiment.

FIG. 9 shows the system architecture of a kinematic ICP module, according to an embodiment. The kinematic ICP module 290 comprises other modules (or sub-modules) including the parameter initialization module 910, the point cloud module 920, the point correspondence module 930, and optimization module 940. Other embodiments may include more or fewer modules. Functionality indicated as being performed by a particular module may be performed by other modules instead.

The parameter initialization module 910 initializes the velocity parameters. The parameter initialization module 910 may initialize the velocity parameters based on values of the velocity parameters determined during a previous time interval. The parameter initialization module 910 may initialize the velocity parameters using sensors of the vehicle that detect parameters describing motion of the vehicle, for example, inertial measurement unit (IMU). The parameter initialization module 910 may also initialize the velocity parameters using data received from GNSS. For example, given two positions of the vehicle obtained from GNSS at two different points in time and the time difference between measurements of the two positions, the parameter initialization module 910 can determine the velocity parameters using kinematic equations.

The point cloud module 920 performs processing related to point clouds including determining points of a point cloud and transforming points of the point cloud. In an embodiment, the point cloud module 920 determines a point cloud as the set of points detected by one or more sensors of a vehicle, for example, by the LIDAR sensor between a start time and an end time. The point cloud module 920 may continue to determine point clouds based on consecutive time intervals, each time interval corresponding to a rotation of the lidar sensor. In an embodiment, the point cloud module 920 determines a point cloud by aggregating data of a plurality of point clouds. The point cloud module 920 aggregates data of two point clouds by mapping points of a point cloud P1 to points of the a point cloud P2 using a transform from the point cloud P1 to the point cloud P2. The point cloud module 920 uses the transform to determine corresponding points of two point clouds.

The point correspondence module 930 determines corresponding points between two point clouds P1 and P2. In an embodiment, the point correspondence module 930 determines pairs of corresponding points (p1, p2) from the point clouds P1 and P2 respectively. For each pair, (p1, p2), the point correspondence module 930 selects points p1 and p2 that are closest to each other. In an embodiment, the point correspondence module 930 establishes a correspondence between points p1 and p2 only if the determining that a source point of the source point cloud corresponds to a target point of the target point cloud if the target point of the target point cloud is the nearest neighbor of the source point and the source point of the source point cloud is determined to be the nearest neighbor of the target point. Accordingly, the closest target point from the source point cloud is also the closest source point from the target point cloud. This requires an extra nearest neighbor lookup per correspondence.

The optimization module 940 performs optimization to determine values of velocity parameters that minimize certain loss function, for example, the distance between corresponding points of two point clouds. In an embodiment, the optimization module 940 uses non-linear optimization techniques to perform the optimization, for example, gradient descent based optimization techniques. As an example, the optimization module 940 may perform non-linear least squares optimization using a solver such as CERES solver.

Assuming the system has previously established a set of correspondences between source and target point cloud, $<s_i(t_{si}), (d_i(t_{di}), n_i(t_{di}))>_i$, i=0, 1, 2, . . . , where $s_i(t_{si})$ represents direct measurements of a point of the source point cloud at time $t_{si}$ and $d_i(t_{di})$ represents direct measurements of a point of the target point cloud at time $t_{di}$, and $n_i(t_{di})$ represents a normal of a surface in the target point cloud corresponding to the point $d_i(t_{di})$. The value of $n_i(t_{di})$ is updated in each iteration with pose estimations.

The point correspondence module 930 computes correspondences by transforming all points according to previous velocity estimates, followed by nearest neighbor search. For each correspondence between source and target point cloud, $<s_i(t_{si}), (d_i(t_{di}), n_i(t_{di}))>$, the point correspondence module 930 determines a measure of point-to-plane error (i.e., the cost function) considering the lidar motion using equation (9).

$$\rho(\|n_i(t_{di}) \cdot [M(t_{si})s_i - M(t_{di})d_i]\|)^2 \quad (9)$$

where $\rho(x)$ is a robustification operator on the loss function that penalizes large loss due to outliers.

The point correspondence module 930 may use one of several robustification operators, e.g., identity function, soft-L1 norm, Lorentz function, and so on. An embodiment uses the Lorentz operator as specified in equation (10).

$$L(x; \sigma) = 1 / \left[1 + \left(\frac{x}{\sigma}\right)^2\right] \quad (10)$$

In these embodiments, the optimization module 940 performs non-linear optimization represented by following equation (11).

$$\min_{v(t_0),\omega(t_0),v(t_1),\omega(t_1),v(t_2),\omega(t_2)} \Sigma_i \ \rho(\|n_i(t_{di}) \cdot [M(t_{si})s_i - M(t_{di})d_i]\|)^2 \quad (11)$$

The equation 11 determines the values of the velocity parameters that minimize the value of $\rho(\|n_i(t_{di}) \cdot [M(t_{si})s_i - M(t_{di})d_i]\|)^2$ over all corresponding points of the source and target point clouds.

Overall Process

Figure 11:
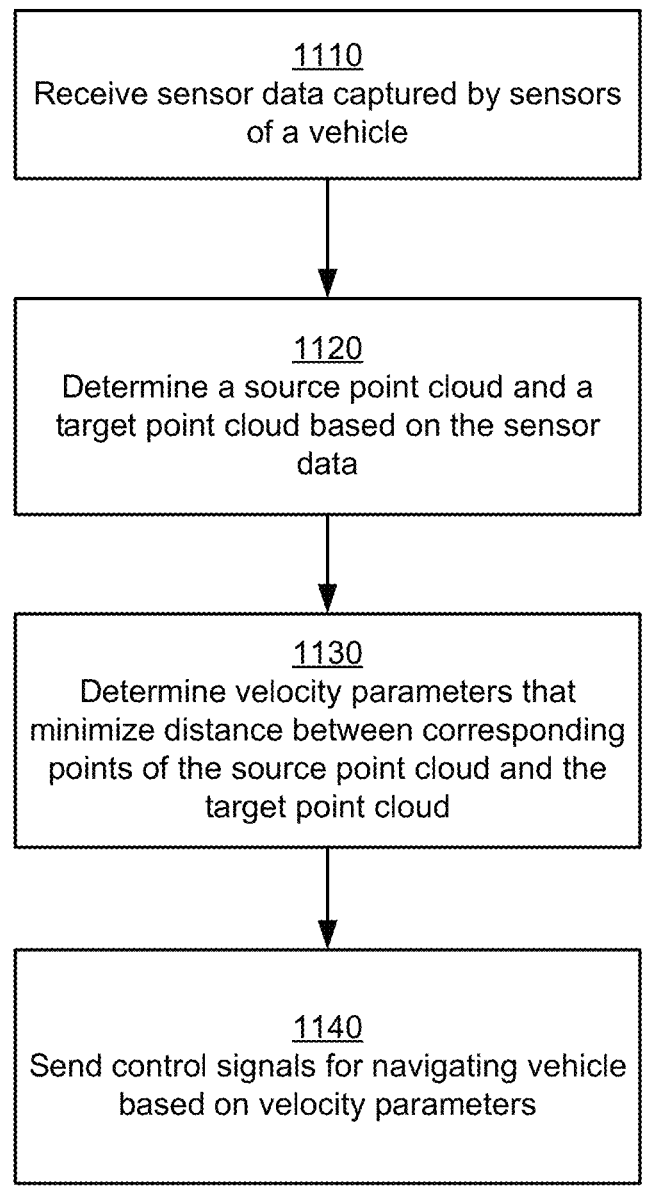
FIG. 11 illustrates the overall process for determining velocity parameters for a vehicle according to an embodiment.

FIG. 11 illustrates the overall process for determining velocity parameters for a vehicle according to an embodiment. The steps described may be performed in an order different from that indicated herein. The steps may be performed by modules other than those indicated herein.

The kinematic ICP module 290 receives 1110 sensor data captured by sensors of a vehicle. For example, the kinematic ICP module 290 may receive 1110 lidar scans captured by a lidar mounted on an autonomous vehicle. The kinematic ICP module 290 determines 1120 a source point cloud P1 and a target point cloud P2 based on the sensor data. The kinematic ICP module 290 determines 1130 velocity parameters that minimize distance between corresponding points of the source point cloud and the target point cloud. The kinematic ICP module 290 provides the velocity parameters to other modules of the vehicle computing system 120. The vehicle computing system 120 determines control signals based on velocity parameters and sends 1140 the control signals to the vehicle controls 130 of the vehicle for navigating the vehicle.

Figure 12:
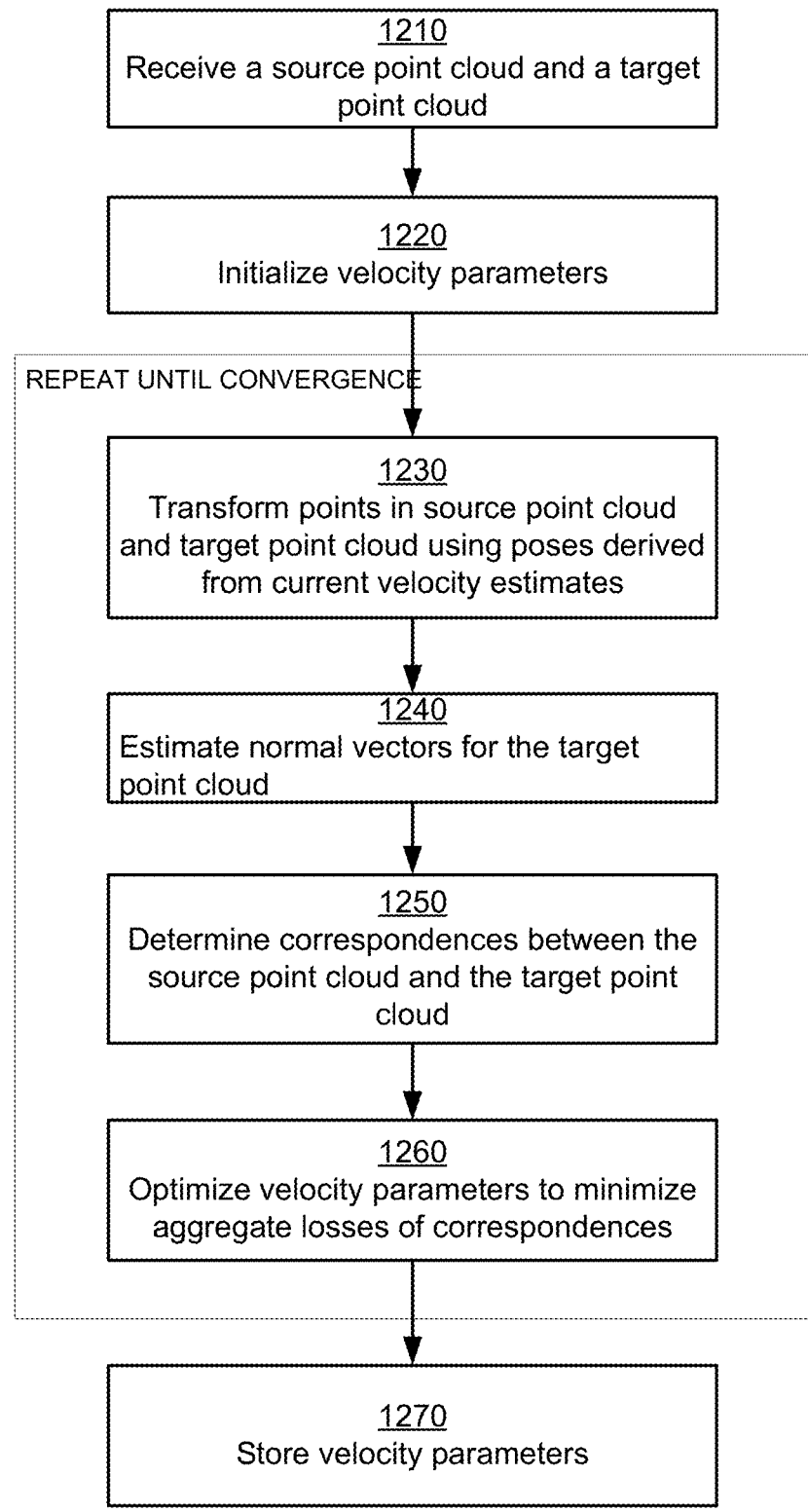
FIG. 12 illustrates the process for performing kinematic ICP according to an embodiment.

FIG. 12 illustrates the process for performing kinematic ICP according to an embodiment. The steps described may be performed in an order different from that indicated herein. The steps may be performed by modules other than those indicated herein.

The kinematic ICP module 290 receives 1210 as input, a source point cloud P1 and a target point cloud P2 for processing. The kinematic ICP module 290 initializes 1220 the velocity parameters, for example, using GNSS-IMU data or based on velocity parameters previously determined.

The kinematic ICP module 290 repeats the following steps 1230, 1240, 1250, and 1260 until convergence.

The kinematic ICP module 290 transforms 1230 points in source point cloud and target point cloud using poses derived from current velocity estimates. The kinematic ICP module 290 transforms 1230 each point to a position of the point if the point was captured while the vehicle was not moving. The points of a point cloud are moved in a direction determined using the direction of movement of the vehicle. The distance by which a point is moved depends on the time of capture of the point. In an embodiment, the kinematic ICP module 290 determines a distance that the vehicle would have moved between the time of capture of the point and a reference time and moves the point within the point cloud by that distance. The reference time may be the time that the lidar scan is completed, for example, the time of capture of the last point of the point cloud. Alternatively, the reference time may be the time that the lidar scan is started. The kinematic ICP module 290 transforms 1230 the points of the point cloud to correspond to a position where the point would be located if the entire lidar scan for capturing the point cloud was taken while the vehicle (or the lidar) was stationary at the position where the vehicle (or the lidar) was located at the reference time. Accordingly, depending on the reference time used, the kinematic ICP module 290 transforms the points of the point cloud to move in the direction of the vehicle movement or opposite to the direction of the vehicle movement. For example, if the reference time is the time of end of the lidar scan corresponding to the point cloud, i.e., the time of capture of the last point captured for the point cloud, the kinematic ICP module 290 transforms the points of the point cloud to move against the direction of the vehicle movement. Alternatively, if the reference time is the time of start of the lidar scan corresponding to the point cloud, i.e., the time of capture of the first point captured for the point cloud, the kinematic ICP module 290 transforms the points of the point cloud to move in the direction of the vehicle movement.

The kinematic ICP module 290 estimates 1240 normal vectors for points selected from the target point cloud. The kinematic ICP module 290 determines 1250 correspondences between the source point cloud and the target point cloud based on the normal vectors. Accordingly, the kinematic ICP module 290 performs the kinematic ICP module 290 determines a surface within the target point cloud in the neighborhood of a selected point of the target point cloud and determines a normal vector for that surface. The kinematic ICP module 290 represents a correspondence as a pair of points p1 and p2 where p1 is selected from the source point cloud and p2 from the target point cloud. The kinematic ICP module 290 determines a nearest point of the source point cloud corresponding to the selected point of the target point cloud along the direction of the normal vector determined for the selected point. In some embodiments, the role of the source point cloud and the target point cloud may be switched and the kinematic ICP module 290 estimates 1240 normal vectors for points selected from the source point cloud for determining the correspondences.

The kinematic ICP module 290 optimizes 1260 velocity parameters to minimize aggregate losses of correspondences. In an embodiment, the kinematic ICP module 290 uses non-linear optimization techniques, for example, gradient descent based optimization techniques for optimizing 1260 the velocity parameters. The kinematic ICP module 290 stores 1270 the velocity parameters in a computer readable storage memory. The velocity parameters may be used for various computations related to the vehicle. For example, the velocity parameters are used for performing localization of the vehicle using the velocity parameters as input to Kalman filtering process. The Kalman filter process is used to extract a clean signal from a set of noisy input samples. For example, of the vehicle computing system receives from a GPS-IMU, some noisy velocity estimates, we the vehicle computing system runs them through a Kalman filter to remove some of the noise and obtain a better initial velocity. In some embodiments, the kinematic ICP module 290 loops the ICP velocity parameters from the previous samples and feeds them into the Kalman filter, to combine the two signals and obtain a better initial estimate.

In an embodiment, a transform from the source point cloud to the target point cloud is determined based on the velocity parameters. The transform is used for various operations, for example, for aligning various point clouds to generate a high-definition map. The high-definition map is used for determining what control signals to generate for navigating the vehicle.

Neighborhood Alignment of Point Clouds

The lidar scan provides a point cloud that is very sparse in the vertical direction. In an embodiment, the HD map system 100 builds a dense target point cloud by incrementally building up a neighborhood of previously aligned point clouds.

Figure 13:
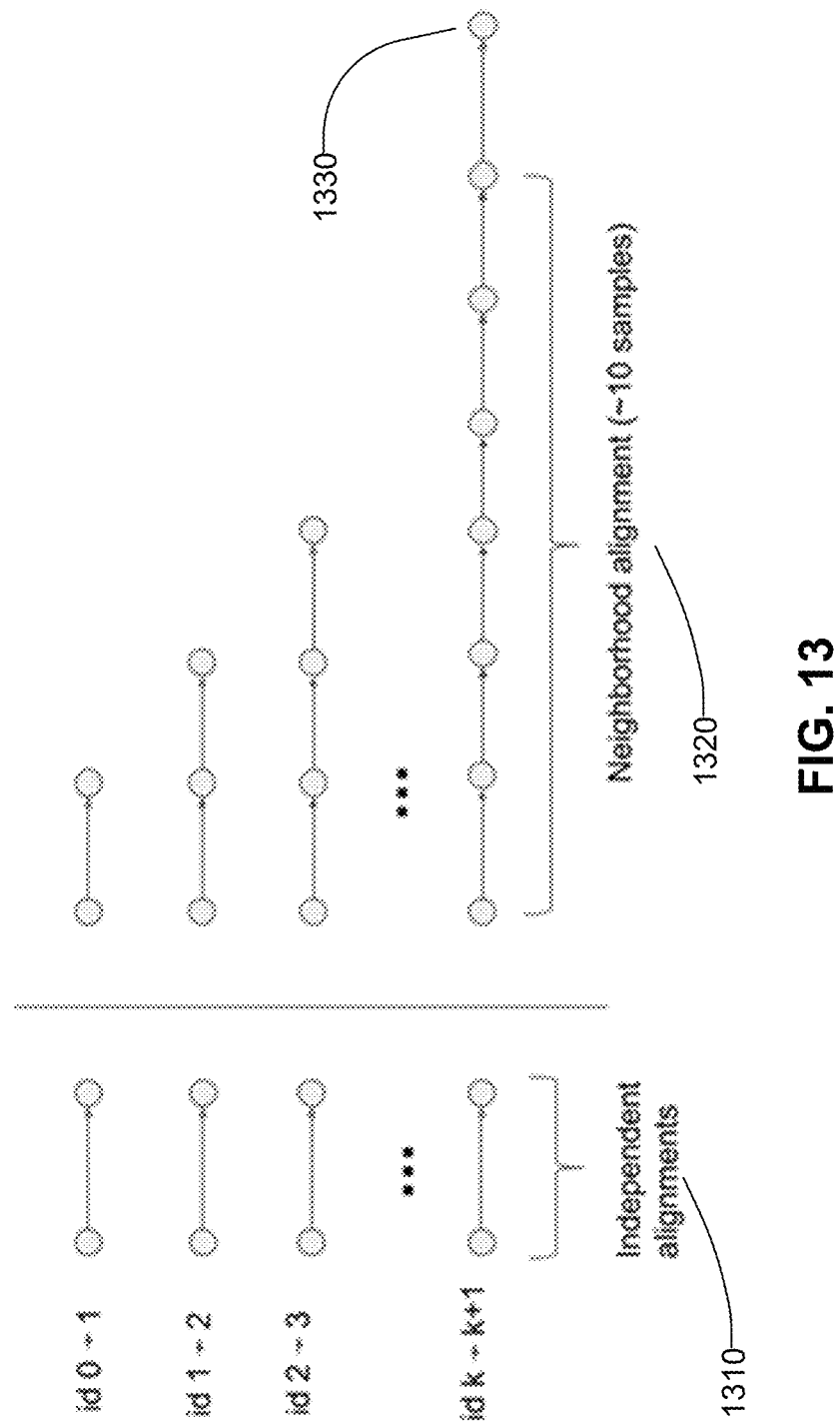
FIG. 13 illustrates neighborhood alignment of point clouds to improve on the density of point clouds, according to an embodiment.

FIG. 13 illustrates neighborhood alignment of point clouds to improve on the density of point clouds, according to an embodiment. The kinematic ICP module 290 may perform independent alignments 1310 that aligns consecutive pairs of point clouds. In an embodiment, the kinematic ICP module 290 determines a target point cloud by aligning a neighborhood 1320 representing a plurality of point clouds. The kinematic ICP module 290 aligns the target point cloud with a source point cloud 1330. The plurality of point clouds of the neighborhood 1320 are obtained by aligning a sequence of consecutive point clouds. The target point cloud is fixed during optimization, which saves having to perform processing such as repeated unwinding and recomputing of KD-trees. This results in significant performance improvement and saves computational resources.

In an embodiment, the neighborhood 1320 is incrementally created as samples are aligned by retaining the k-most recent samples and their pairwise/unwinding transforms in a first in first out (FIFO) queue. The neighborhood is merged into to a single point cloud, which serves as the target point cloud for alignment. The point clouds are loaded from a permanent storage such as a disk into a computer memory, aligned, added to the neighborhood, merged for some number of times, and then used for any subsequent processing.

In an embodiment, the HD map system 100 selects the neighborhood size by either a fixed number of point clouds, or by a distance, i.e., by aligning all point clouds within a distance. In embodiments that uses distance to select the neighborhood, the computation and memory cost of merging can increase in low-speed tracks but diminish to very small values in highways (where every point is significant). Accordingly, the HD map system 100 may prefer distance based neighborhoods on highways. The fixed size neighborhood has similar performance on low-speed tracks or highways.

In some embodiments, the kinematic ICP module 290 may perform alignment of point clouds in parallel. The kinematic ICP module 290 splits a vector of non-stationary sample ids is in N subarrays and used N threads (or processes) for performing alignments in parallel. Each thread processes a sub-array and its own neighborhood. The kinematic ICP module 290 could potentially process alignment of each pair in parallel using a distinct computer processor.

Adaptive Timestep Adjustment

In an embodiment, the kinematic ICP module 290 determines a timestep representing time difference between the source point cloud and the target point cloud based on a measure of error in computing the velocity parameters. The kinematic ICP module 290 uses a model of vehicle motion to compute velocity parameters. The model is chosen for computational performance and accuracy, but simplifies the true complex vehicle motion. In an embodiment, the kinematic ICP module 290 uses an adaptive model that estimates the error due to modeling and adjusts timesteps accordingly.

In an embodiment, the kinematic ICP module 290 determines a measure of error as follows. The kinematic ICP module 290 uses a model that approximates an acceleration by a constant velocity. Let the initial time t=0, and the final time t=b. The location of maximum error is independent of acceleration a and occurs at t=b/2, i.e., the midpoint of the interval. The error E at this point is estimated using the equation $$E\left(\frac{b}{2}\right) = \frac{1}{8}ab^2.$$

For curved motions, the kinematic ICP module 290 determines the error using the equation $E=R-R\cos(\theta/2)$, where R is the radius and θ is the angle of the curve. The kinematic ICP module 290 uses these equations to calculate the model approximation error. The kinematic ICP module 290 subdivides the timestep until these errors are below a given threshold.

In an embodiment, the kinematic ICP module 290 performs the following steps for adaptively determining the timestep. The kinematic ICP module 290 determines a value dt to be the full timestep from sample-to-sample.

The kinematic ICP module 290 determines model approximation errors using equations for rotational error ($e=R-R\cos(\theta/2)$) and acceleration $$\left(E\left(\frac{b}{2}\right) = \frac{1}{8}ab^2\right).$$

If the kinematic ICP module 290 determines that the errors are above a threshold, kinematic ICP module 290 subdivides the timestep. The kinematic ICP module 290 repeats these two steps of determining model approximation errors and subdividing the timesteps while dt is greater than a threshold minimum timestep value.

Regularization for Improving Convergence of ICP

In some embodiments, the kinematic ICP module 290 adds a regularization term to improve convergence of the result. In certain situations, the vehicle drives through surroundings where the point cloud data is sparse and the constraints for the ICP process are poor in specific directions. For example, if the vehicle is driving through a tunnel or a bridge or a highway with very little scenery change, the constraints along the direction of in which the vehicle is driving are poor since the aggregate measure of error between two consecutive point clouds does not change significantly by moving along that direction. As a result, convergence of the ICP process is slow or the process may even diverge.

In these embodiments, the kinematic ICP module 290 depends on having a reasonable initial estimate that is derived from reliable sources, for example, velocity estimates derived from GPS-IMU data or a previous set of values that was determined recently. The kinematic ICP module 290 uses IMU data that described vehicle acceleration for determining current velocity estimates and uses GPS data to determine the vehicle global position and combines the two data to determine estimates of velocity for the vehicle. The kinematic ICP module 290 uses the GPS position data for bias correction in the IMU acceleration data. The kinematic ICP module 290 adds a regularization term to the measure of error for the ICP. For example, the error estimate is represented as $\|K_v + W_{GPS}\|$ where $K_v$ is the error estimate for ICP and $W_{GPS}$ is a regularization term. The regularization term prevents the ICP iterations from diverging in presence of sparse data.

Computing Machine Architecture

Figure 14:
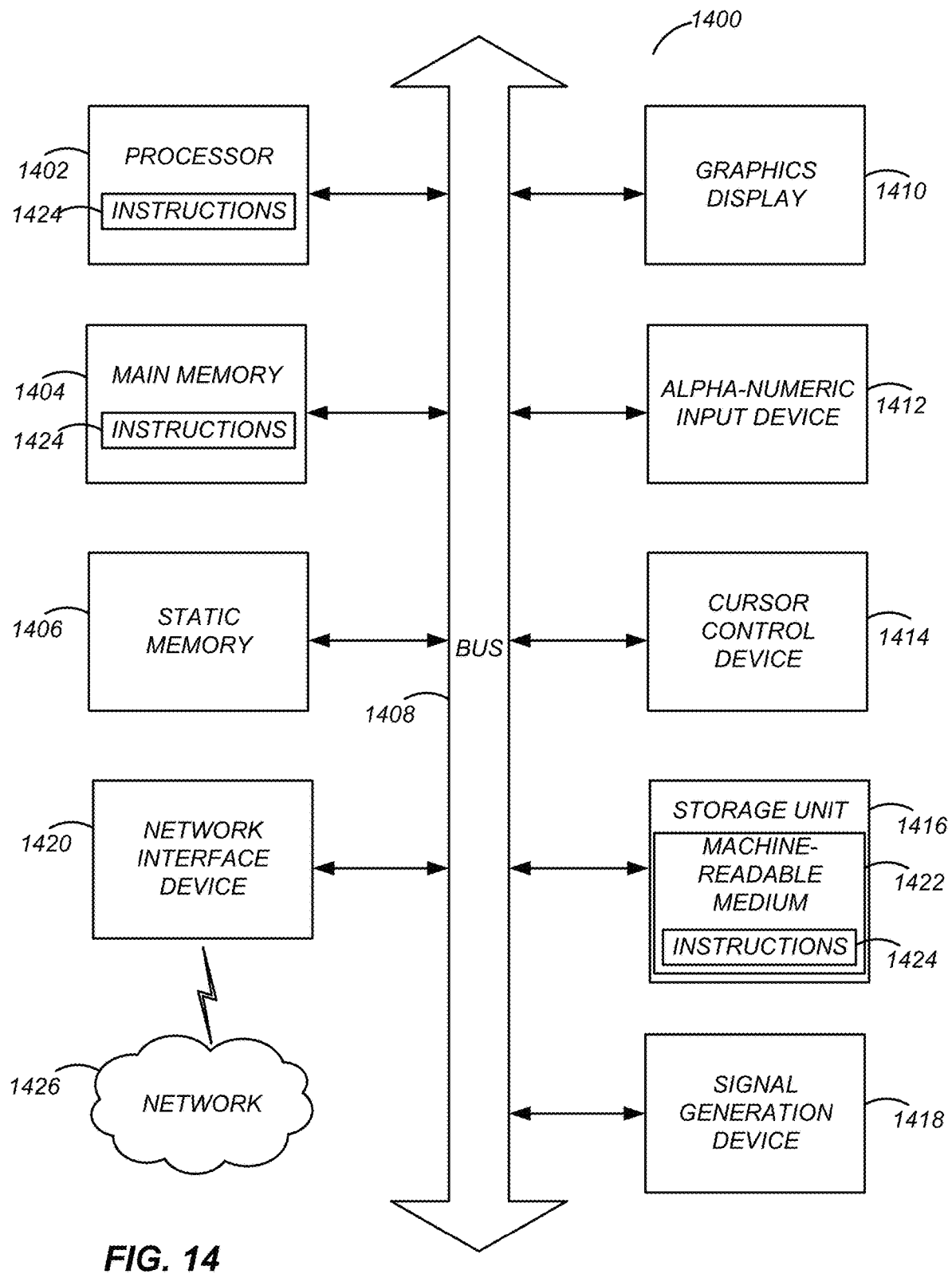
FIG. 14 illustrates an embodiment of a computing machine that can read instructions from a machine-readable medium and execute the instructions in a processor or controller.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A non-transitory computer readable storage medium storing instructions, the instructions when executed by one or more processors, cause a system to perform steps including:

receiving, by a lidar sensor mounted on an autonomous vehicle, sensor data describing an environment surrounding the autonomous vehicle, the sensor data comprising a plurality of points, each point associated with a time of capture of the point by the lidar sensor;

determining based on the plurality of points, a source point cloud and a target point cloud;
initializing a plurality of velocity parameters describing movement of the autonomous vehicle;
repeating, for a plurality of iterations:
  determining a plurality of pairs of points, each pair of points comprising a point from the source point cloud and a corresponding point from the target point cloud;
  adjusting a timestep representing a time difference between the source point cloud and the target point cloud based on a measure of error in computing the velocity parameters; and
  modifying the velocity parameters to optimize an aggregate measure of distance between corresponding points of the plurality of pairs of points;
determining control signals for navigating the autonomous vehicle based on the velocity parameters; and
navigating the autonomous vehicle based on the control signals.

2. The non-transitory computer readable storage medium of claim 1, wherein the instructions further cause the processor to perform steps comprising:
adjusting at least one point cloud from the source point cloud or the target point cloud based on the velocity parameters, the adjusting comprising transforming the points of the at least one point cloud based on the velocity parameters and the time of capture of the point.

3. The non-transitory computer readable storage medium of claim 2, wherein transforming the points of the at least one point cloud comprises, for each of a set of point of the at least one point cloud, moving the point by a distance, wherein the distance is an estimate of the distance traveled by the autonomous vehicle in a time interval between the time of capture of the point and a reference time, the distance traveled determined based on the velocity parameters.

4. The non-transitory computer readable storage medium of claim 1, wherein the velocity parameters comprise one or more linear velocity parameters and one or more angular velocity parameters.

5. The non-transitory computer readable storage medium of claim 1, wherein the velocity parameters comprise one or more velocity parameters corresponding to a start of scan of the source point cloud and one or more velocity parameters corresponding to a start of scan of the target point cloud.

6. The non-transitory computer readable storage medium of claim 5, wherein the velocity parameters further comprise one or more velocity parameters corresponding to an end of scan of the source point cloud and one or more velocity parameters corresponding to an end of scan of the target point cloud, wherein the end of scan of the source point cloud matches the start of scan of the target point cloud.

7. The non-transitory computer readable storage medium of claim 1, wherein optimization of the aggregate measure of distance between corresponding points of the plurality of pairs of points uses one or more constraints limiting the velocity parameters to estimates of maximum velocity parameters determined based on physical movement of the autonomous vehicle.

8. The non-transitory computer readable storage medium of claim 1, wherein optimization of the aggregate measure of distance between corresponding points of the plurality of pairs of points is a non-linear optimization.

9. The non-transitory computer readable storage medium of claim 1, wherein optimization of the aggregate measure of distance between corresponding points of the plurality of pairs of points comprises constraining a velocity parameter to at least one of a high threshold or a low threshold, wherein the at least one of the high threshold or the low threshold is determined based on physical constraints on a moving vehicle.

10. The non-transitory computer readable storage medium of claim 1, wherein initializing the plurality of velocity parameters comprises determining values of the plurality of velocity parameters based on data obtained from an inertial measurement unit of the autonomous vehicle.

11. The non-transitory computer readable storage medium of claim 1, wherein initializing the plurality of velocity parameters comprises determining values of the plurality of velocity parameters based on data describing positions of the autonomous vehicle obtained from a global navigation satellite system.

12. The non-transitory computer readable storage medium of claim 1, wherein instructions for determining the plurality of points further comprise instructions that cause the processor to perform steps comprising:
determining the measure of distance between a pair of corresponding points, wherein the pair of corresponding points comprises a source point of the source point cloud and a target point of the target point cloud, the determining comprising:
  determining a normal direction along a surface of the target point cloud at the target point, and
  determining a distance between the source point and the target point along the normal direction.

13. The non-transitory computer readable storage medium of claim 1, wherein the instructions further cause the processor to perform steps comprising:
determining the source point cloud by aggregating data of a plurality of point clouds obtained by sensor data captured by lidar sensor of the autonomous vehicle.

14. The non-transitory computer readable storage medium of claim 1, wherein instructions for determining a pair of points as corresponding points cause the processor to perform steps comprising:
determining that a source point of the source point cloud corresponds to a target point of the target point cloud if the target point of the target point cloud is a nearest neighbor of the source point and the source point of the source point cloud is determined to be a nearest neighbor of the target point.

15. The non-transitory computer readable storage medium of claim 1, wherein instructions for determining control signals for navigating the autonomous vehicle cause the processor to perform steps comprising:
performing localization of the autonomous vehicle using the velocity parameters as input to Kalman filter.

16. The non-transitory computer readable storage medium of claim 15, wherein instructions for determining control signals for navigating the autonomous vehicle cause the processor to perform steps comprising:
determining a transformation from the source point cloud to the target point cloud based on the velocity parameters.

17. The non-transitory computer readable storage medium of claim 16, wherein instructions for determining control signals for navigating the autonomous vehicle cause the processor to perform steps comprising:
determining a high definition map based on the transformation; and determining control signals for navigating the autonomous vehicle based on the high definition map.

18. The non-transitory computer readable storage medium of claim 1, wherein each point comprises an intensity value received from the lidar, and wherein the measure of distance between corresponding points of a pair of points is based on a difference in intensity values of the points of the pair of points.

19. A computer-implemented method comprising:
receiving, by a sensor mounted a navigable machine, sensor data describing an environment surrounding the navigable machine, the sensor data comprising a plurality of points, each point associated with a time of capture of the point by the sensor;
determining based on the plurality of points, a source point cloud and a target point cloud;
initializing a plurality of velocity parameters describing movement of the navigable machine;
performing an Iterative Closest Point (ICP) process with respect to the source point cloud and the target point cloud, the ICP process including repeating, for a plurality of iterations:
  determining a plurality of pairs of points, each pair of points comprising a point from the source point cloud and a corresponding point from the target point cloud;
  adjusting a timestep representing a time difference between the source point cloud and the target point cloud based on a measure of error in computing the velocity parameters; and
  modifying the velocity parameters to optimize an aggregate measure of distance between corresponding points of the plurality of pairs of points;
determining control signals for navigating the navigable machine based on the velocity parameters; and
navigating the navigable machine based on the control signals.

20. The computer-implemented method of claim 19, further comprising:
adjusting at least one point cloud from the source point cloud or the target point cloud based on the velocity parameters, the adjusting comprising transforming the points of the at least one point cloud based on the velocity parameters and the time of capture of the point.

21. The computer-implemented method of claim 20, wherein transforming the points of the at least one point cloud comprises, for each of a set of point of the at least one point cloud, moving the point by a distance, wherein the distance is an estimate of the distance traveled by the navigable machine in a time interval between the time of capture of the point and a reference time, the distance traveled determined based on the velocity parameters.

22. The computer-implemented method of claim 19, wherein the velocity parameters comprise one or more linear velocity parameters and one or more angular velocity parameters.

23. The computer-implemented method of claim 19, wherein the velocity parameters comprise one or more velocity parameters corresponding to a start of scan of the source point cloud and one or more velocity parameters corresponding to a start of scan of the target point cloud.

24. The computer-implemented method of claim 23, wherein the velocity parameters further comprise one or more velocity parameters corresponding to an end of scan of the source point cloud and one or more velocity parameters corresponding to an end of scan of the target point cloud, wherein the end of scan of the source point cloud matches the start of scan of the target point cloud.

25. The computer-implemented method of claim 19, wherein optimization of the aggregate measure of distance between corresponding points of the plurality of pairs of points uses one or more constraints limiting the velocity parameters to estimates of maximum velocity parameters determined based on physical movement of the navigable machine.

26. The computer-implemented method of claim 19, wherein optimization of the aggregate measure of distance between corresponding points of the plurality of pairs of points is a non-linear optimization.

27. The computer-implemented method of claim 19, wherein optimization of the aggregate measure of distance between corresponding points of the plurality of pairs of points comprises constraining a velocity parameter to at least one of a high threshold or a low threshold, wherein the at least one of the high threshold or the low threshold is determined based on physical constraints on a moving vehicle.

28. The computer-implemented method of claim 19, wherein initializing the plurality of velocity parameters comprises determining values of the plurality of velocity parameters based on data obtained from an inertial measurement unit of the navigable machine.

29. The computer-implemented method of claim 19, wherein initializing the plurality of velocity parameters comprises determining values of the plurality of velocity parameters based on data describing positions of the navigable machine obtained from a global navigation satellite system.

30. The computer-implemented method of claim 19, wherein determining the plurality of points comprises:
determining the measure of distance between a pair of corresponding points, wherein the pair of corresponding points comprises a source point of the source point cloud and a target point of the target point cloud, the determining comprising:
determining a normal direction along a surface of the target point cloud at the target point, and
determining a distance between the source point and the target point along the normal direction.

31. The computer-implemented method of claim 19, further comprising:
determining the source point cloud by aggregating data of a plurality of point clouds obtained by sensor data captured by sensor of the navigable machine.

32. The computer-implemented method of claim 19, wherein determining a pair of points as corresponding points comprises:
determining that a source point of the source point cloud corresponds to a target point of the target point cloud if the target point of the target point cloud is a nearest neighbor of the source point and the source point of the source point cloud is determined to be a nearest neighbor of the target point.

33. The computer-implemented method of claim 19, wherein determining control signals for navigating the navigable machine comprises:
performing localization of the navigable machine using the velocity parameters as input to Kalman filter.

34. The computer-implemented method of claim 33, wherein determining control signals for navigating the navigable machine comprises:
determining a transformation from the source point cloud to the target point cloud based on the velocity parameters.

35. The computer-implemented method of claim 34, wherein determining control signals for navigating the navigable machine comprises:

determining a high definition map based on the transformation; and determining control signals for navigating the navigable machine based on the high definition map.

36. The computer-implemented method of claim 19, wherein each point comprises an intensity value received from the sensor, and wherein the measure of distance between corresponding points of a pair of points is based on a difference in intensity values of the points of the pair of points.

37. The computer-implemented method of claim 19, wherein the navigable machine is a robot.

38. The computer-implemented method of claim 19, wherein the navigable machine is a vehicle.

39. A computer system comprising:
    one or more processors; and
    a non-transitory computer readable storage medium storing instructions, the instructions when executed by the one or more processors, cause the computer system to perform steps including:
        receiving, by a lidar sensor mounted on an autonomous vehicle, sensor data describing an environment surrounding the autonomous vehicle, the sensor data comprising a plurality of points, each point associated with a time of capture of the point by the lidar sensor;
        determining based on the plurality of points, a source point cloud and a target point cloud;
        initializing a plurality of velocity parameters describing movement of the autonomous vehicle;
        repeating, for a plurality of iterations:
            determining a plurality of pairs of points, each pair of points comprising a point from the source point cloud and a corresponding point from the target point cloud;
            adjusting a timestep representing a time difference between the source point cloud and the target point cloud based on a measure of error in computing the velocity parameters; and
            modifying the velocity parameters to optimize an aggregate measure of distance between corresponding points of the plurality of pairs of points;
        determining control signals for navigating the autonomous vehicle based on the velocity parameters; and
        navigating the autonomous vehicle based on the control signals.

* * * * *